United States Patent [19]

Roe

[11] Patent Number: 4,538,780
[45] Date of Patent: Sep. 3, 1985

[54] ULTRALIGHT COMPOSITE WING STRUCTURE

[75] Inventor: Richard D. Roe, Wichita, Kans.

[73] Assignee: The Boeing Company, Seattle, Wash.

[21] Appl. No.: 535,421

[22] Filed: Sep. 26, 1983

[51] Int. Cl.³ .............................................. B64C 3/18
[52] U.S. Cl. ..................................... 244/123; 416/226
[58] Field of Search .................. 244/123, 117 R, 124, 244/125, 133; 416/230, 226, 241 A, 187; 52/84

[56] References Cited

U.S. PATENT DOCUMENTS

| | | | |
|---|---|---|---|
| 2,806,663 | 9/1957 | Rosenblatt | 244/123 |
| 3,396,922 | 8/1968 | Windecker | 244/123 |
| 3,396,923 | 8/1968 | Windecker | 244/123 |
| 3,416,756 | 12/1968 | Windecker | 244/123 |
| 3,768,760 | 10/1973 | Jensen | 244/123 |
| 4,079,903 | 3/1978 | Ashton et al. | 244/123 |

*Primary Examiner*—Galen L. Barefoot
*Attorney, Agent, or Firm*—Edwin H. Crabtree

[57] ABSTRACT

A composite wing structure for an aircraft, missile and the like. The structure characterized by the use of ultralight materials and having a potential of being stealthy.

6 Claims, 4 Drawing Figures

ULTRALIGHT COMPOSITE WING STRUCTURE

BACKGROUND OF THE INVENTION

This invention relates to an improved wing structure and more particularly but not by way of limitation to an ultralight composite wing structure using plastic foam and filamentary materials. (e.g. graphite, kevlar, etc.)

Heretofore, there have been various types of aircraft wing structure using molded laminents, polymeric materials, reinforced graphite, and other types of lightweight filament wound materials along with plastic resins. These types of wing structures are described in the following United States patents U.S. Pat. No. 3,108,924 to Adie, U.S. Pat. No. 3,273,833 to Windecker, U.S. 3,396,922 to Windecker, U.S. Pat. No. 3,349,157 to Parsons, U.S. Pat. No. 3,416,756 to Windecker, U.S. Pat. No. 3,519,228 to Windecker, U.S. Pat. No. 3,645,481 to Purdy, U.S. Pat. No. 3,902,944 to Ashton, U.S. Pat. No. 4,079,903 to Ashton and U.S. Pat. No. 4,228,976 to Eiselbrecher et al. None of the above mentioned patents particularly point out the unique features and advantages of the subject ultralight composite wing structure as described herein.

SUMMARY OF THE INVENTION

The subject invention provides a lightweight yet high strenth aircraft wing structure.

By using reinforced plastics and injected polyurethane foam, the subject wing structure has the potential of being stealthy.

The wing structure is easy to manufacture, simple in design and can be used for various types of aircraft, missiles and the like.

The ultralight composite wing structure for an aircraft, missile or the like includes a wing body made of lightweight polyurethane material and having a graphite reinforced plastic skin surrounding its body. A plurality of longitudinal graphite reinforced tendons are disposed along the length of the wing body and adjacent the wing skin. A plurality of plastic fuel tanks with bondable fuel barriers and graphite reinforced are disposed along the length of the wing body.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
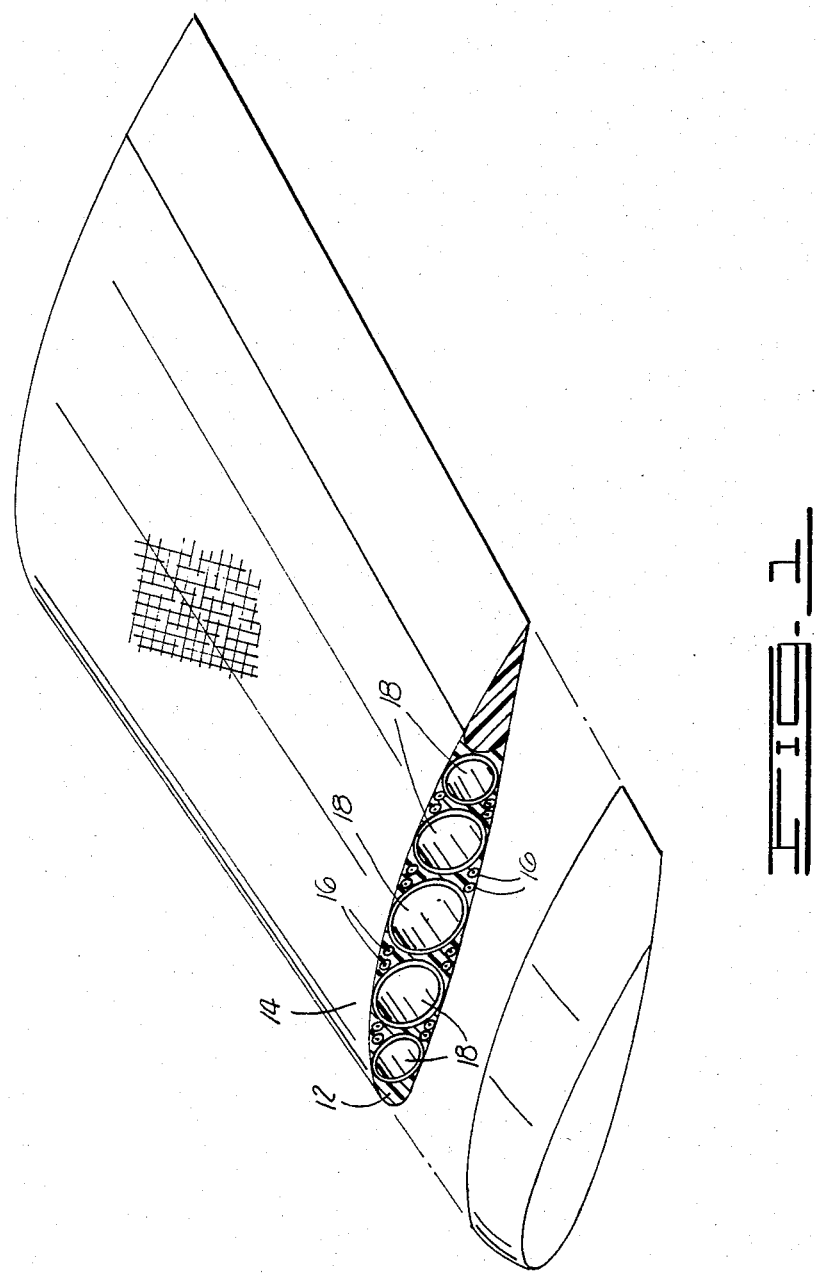
FIG. 1 is a perspective view of the composite wing structure with a portion of the wing cut-away to expose the internal structure of the wing.

In FIG. 1 the ultralight composite wing structure is designated by general reference numeral 10. The wing structure 10 includes a wing body 12 formed in place using polyurethane foam, lightened with foam balls or any similar type of material. The foam balls are not shown in the drawings. The body 12 is surrounded by a graphite reinforced plastic skin 14. Running along the length of the body 12 and adjacent the skin 14 are a plurality of elongated longitudinal tendons 16 for providing bending stiffness to the wing 10. Also disposed along the length of the body 12 are a plurality of elongated fuel tanks 18 constructed of filament wound graphite with bondable mylar fuel barriers.

Figure 2:
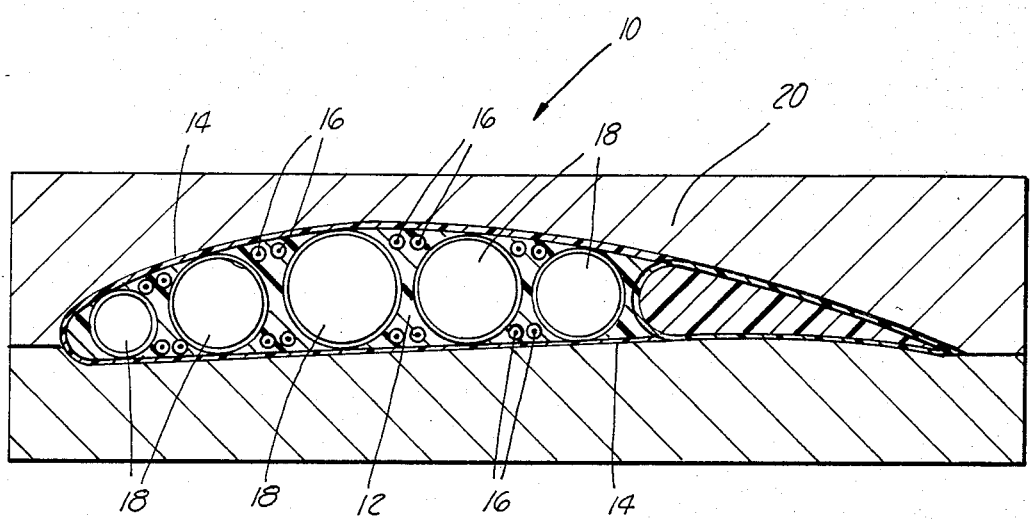
FIG. 2 is a side sectional view of the wing structure inside an upper and lower wing mold.

In FIG. 2 the composite wing structure 10 can be seen in cross-section formed between an upper mold 20 and a lower mold 22. By forming the graphite reinforced plastic skin 14 and injecting the polyurethane foam making up the body 12 into the skin 14 and in and around the reinforced fuel tanks 18 and around the longitudinal tendons 16, the ultralight wing structure 10 can be easily manufactured and formed to a desired shape, length and width.

Figure 3:
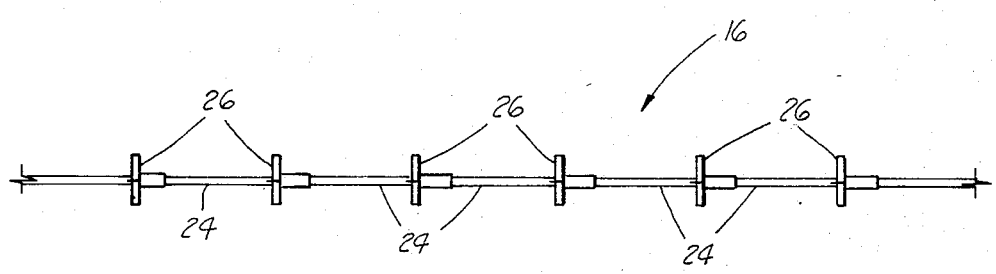
FIG. 3 illustrates one of the longitudinal tendons.
Figure 3A:
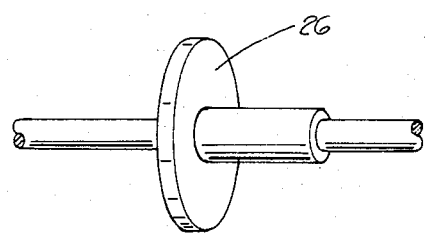
FIG. 3A illustrates one of the shear lugs bonded to a tendon.

In FIG. 3 one of the longitudinal tendons 16 is illustrated. The tendon 16 is made up of pultruded unidirectional filamentary reinforced plastic resin tendon members 24 continuous along the length of the structure and spliced at production breaks. A plurality of shear lugs 26 are bonded to the tendons 16 along its length. The shear lugs 26 as shown in FIG. 3A extends laterally outward into the foam body 12 for transferring tension loading along the length of the tendon 16 to shear loading in the body 12 of the wing structure 10. The lugs 26 are shown as circular in shape but may be made into various geometric shapes.

Changes may be made in the construction and arrangement of the parts or elements of the embodiments as described herein without departing from the spirit or scope of the invention defined in the following claims.

What is claimed is:

1. A composite wing structure, the structure comprising:
   a wing body made of a lightweight foam material and the like;
   a reinforced plastic wing skin, the skin disposed around the body of the wing; and
   a plurality of longitudinal tendons running along the length of the body of the wing and adjacent the wing skin, the tendons including a plurality of individual tendon members joined together end to end by plastic shear lugs adhesively bonded to each other, the lugs extending laterally outward into the foam body for transferring tension loading along the length of the tendons to shear loading in the foam body of the wing structure.

2. The structure as described in claim 1 further including at least one plastic fuel tank disposed in the wing body and running along the length thereof.

3. A composite wing structure, the structure comprising:
   a wing body made of a lightweight polyurethane foam and lightened with foam balls therein;
   a reinforced plastic wing skin, the skin disposed along the body of the wing; and
   a plurality of longitudinal tendons running along the length of the body of the wing and adjacent the wing skin, the tendons including a plurality of individual tendon members joined together end to end by plastic shear lugs adhesively bonded to each other, the lugs extending laterally outward into the foam body for transferring tension loading along the length of the tendons to shear loading in the foam body of the wing structure.

4. The structure as described in claim 3 wherein the tendon members are made of pultruded unidirectional graphite reinforced plastic.

5. The wing structure as described in claim 3 wherein the plastic skin is reinforced using filament wound graphite.

6. The structure as described in claim 3 further including a plurality of plastic fuel tanks disposed in the wing body and parallel to each other and running along the length of the wing body, the fuel tanks reinforced with filament wound graphite with a bondable mylar fuel barrier.

* * * * *